(12) United States Patent
Lee et al.

(10) Patent No.: US 7,664,850 B2
(45) Date of Patent: Feb. 16, 2010

(54) SYSTEM FOR MEASURING COMMUNICATION QUALITY AND METHOD THEREOF

(75) Inventors: Jae-Wook Lee, Daejon (KR); Gil-Haeng Lee, Daejon (KR); Young-Sun Kim, Daejon (KR)

(73) Assignees: Electronics and Telecommunications Research Institute, Daejeon (KR); KT Corporation, Kyoungki-do (KR)

( * ) Notice: Subject to any disclaimer, the term of this patent is extended or adjusted under 35 U.S.C. 154(b) by 696 days.

(21) Appl. No.: 11/184,416

(22) Filed: Jul. 19, 2005

(65) Prior Publication Data

US 2006/0135148 A1 Jun. 22, 2006

(30) Foreign Application Priority Data

Dec. 16, 2004 (KR) ........................ 10-2004-0107263

(51) Int. Cl.
G06F 15/173 (2006.01)
H04L 12/26 (2006.01)

(52) U.S. Cl. ........................................ 709/224; 370/241
(58) Field of Classification Search ........................ None
See application file for complete search history.

(56) References Cited

U.S. PATENT DOCUMENTS

| 5,504,754 | A | * | 4/1996 | Grunenfelder | 714/712 |
| 6,157,615 | A | * | 12/2000 | Akagawa et al. | 370/241 |
| 6,498,783 | B1 | * | 12/2002 | Lin | 370/252 |
| 2003/0131085 | A1 | * | 7/2003 | Zhang et al. | 709/223 |
| 2004/0199659 | A1 | * | 10/2004 | Ishikawa et al. | 709/235 |
| 2005/0086362 | A1 | * | 4/2005 | Rogers | 709/235 |
| 2006/0031469 | A1 | * | 2/2006 | Clarke et al. | 709/224 |

FOREIGN PATENT DOCUMENTS

| JP | 05-268118 A | 10/1993 |
| JP | 08-237261 A | 9/1996 |
| KR | 1999-0005389 A | 1/1999 |
| KR | 2000-0020432 | 4/2000 |
| KR | 20020078240 | 10/2002 |
| KR | 20030028013 | 4/2003 |
| KR | 20030028264 | 4/2003 |
| KR | 10-0408525 | 5/2003 |
| KR | 1020040082032 A | 9/2004 |

* cited by examiner

*Primary Examiner*—John B. Walsh
(74) *Attorney, Agent, or Firm*—Ladas & Parry LLP

(57) ABSTRACT

A system for measuring a communication quality and a method thereof are disclosed. The system includes: a first communication quality measuring unit for requesting a second communication quality measuring unit to transmit a test traffic, measuring a communication quality from the test traffic received from the second communication quality measuring unit as a response of the request, and controlling a generation frequency and an amount of test traffic for a next communication quality measuring stage by analyzing the measured communication quality; and the second communication quality measuring unit for generating a test traffic by controlling a generation frequency and an amount of the test traffic according to a request of the first communication quality measuring unit.

11 Claims, 4 Drawing Sheets

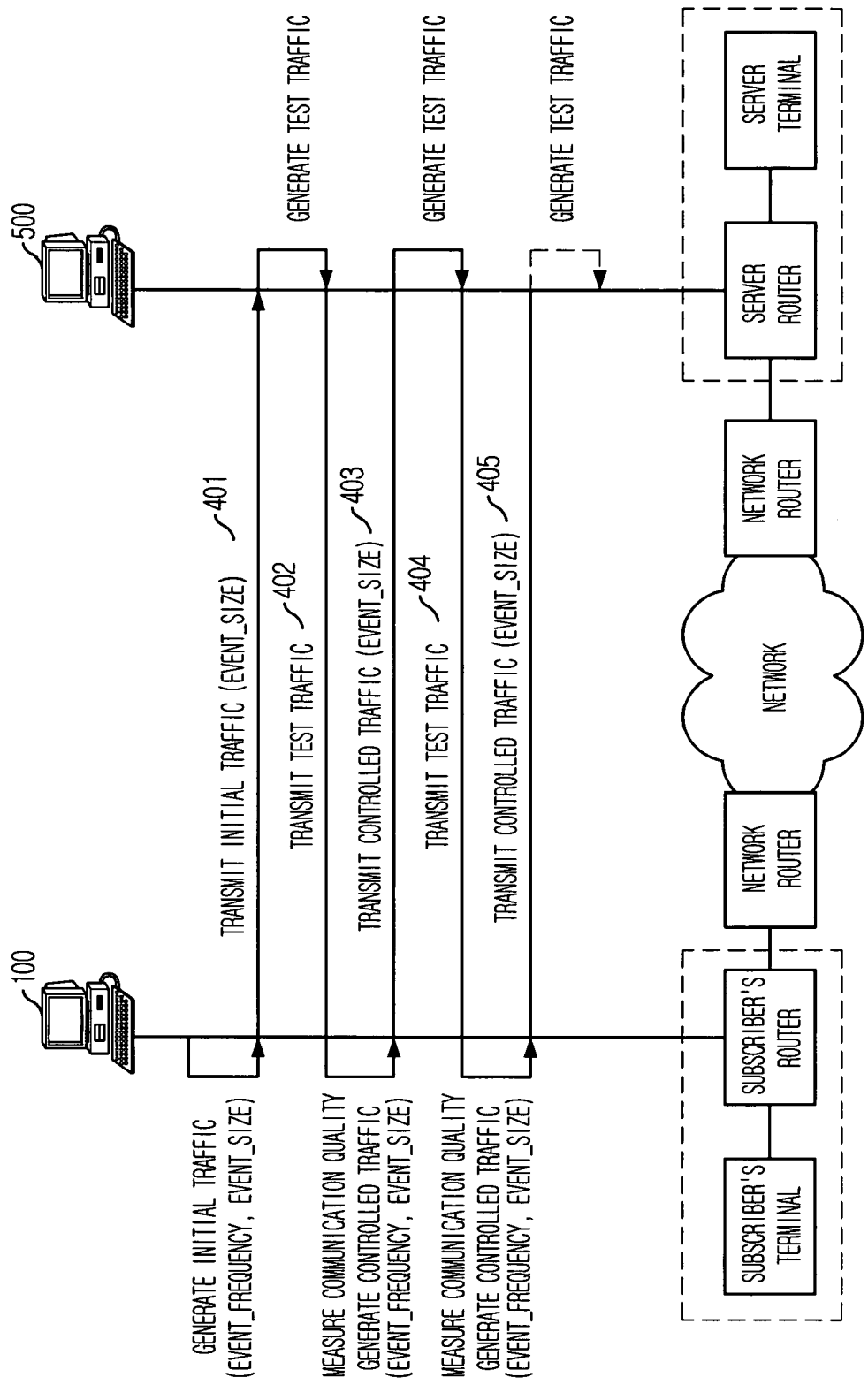

SYSTEM FOR MEASURING COMMUNICATION QUALITY AND METHOD THEREOF

FIELD OF THE INVENTION

The present invention relates to a system for measuring a communication quality and a method thereof; and, more particularly, to a system for measuring a communication quality by dynamically changing a generation frequency and an amount of a test traffic based on a previous communication quality measuring result in order to minimize influence of the test traffic to a communication quality and to minimize distortion of a communication quality caused by the test traffic, and a method thereof.

DESCRIPTION OF THE PRIOR ART

In order to measure a communication quality while a subscriber is receiving a communication service, the communication quality is measured by installing a plurality of communication quality measuring devices at several locations in a communication network. Generally, there are two schemes introduced for measuring the communication quality such as a passive scheme and an active scheme. In the passive scheme, data traffic is inspected by the communication quality measuring devices without influencing to a subscriber terminal. In the active scheme, the communication quality measuring device generates the test traffic as like as data traffic generated by a subscriber terminal and the communication quality is measured based on the generated test traffic.

Accordingly, the passive scheme requires a high-cost equipment, and may disturb a personal privacy since data traffic of a subscriber is inspected in real time by a communication quality measuring device of the passive scheme. On contrary, since a subscriber's traffic is not inspected in real time in the active scheme, a comparative cheaper measuring equipment is required and a subscriber's privacy is not disturbed in the active scheme. In order to measure the communication quality in the active scheme, a communication quality measuring device of the active scheme generates the test traffic. Such a generated test traffic degrades the communication quality in a subscriber's communication line. For example, when about 5 Mbps of test traffic is generated in a subscriber's line having 10 Mbps of bandwidth, a communication quality is degraded by the test traffic and a result of the communication quality measurement may be also distorted by the test traffic.

Accordingly, there is a great demand for a communication quality measurement system and method to minimize occupancy of a bandwidth of subscriber's communication network and to minimize a communication quality distortion by the generated test traffic while having advantages of the active scheme such as low-cost and security of personal privacy.

SUMMARY OF THE INVENTION

It is, therefore, an object of the present invention to provide a system for measuring a communication quality by dynamically changing a generation frequency and an amount of a test traffic based on a previous result of measuring a communication quality in order to minimize influence of the test traffic to a communication quality and to minimize distortion of a communication quality caused by test traffic, and a method thereof.

In accordance with an aspect of the present invention, there is provided a system for measuring a communication quality including: a first communication quality measuring unit for requesting a second communication quality measuring unit to transmit a test traffic, measuring a communication quality from the test traffic received from the second communication quality measuring unit as a response of the request, and controlling a generation frequency and an amount of test traffic for a next communication quality measuring stage by analyzing the measured communication quality; and the second communication quality measuring unit for generating a test traffic by controlling a generation frequency and an amount of the test traffic according to a request of the first communication quality measuring unit.

In accordance with another aspect of the present invention, there is provided a method for measuring a communication terminal, the method comprising the steps of: a) at a first measuring unit, initializing an event frequency and an event amount, and controlling a second measuring unit to generate a test traffic according to the initialized event frequency and the initialized event amount; b) at the first measuring unit, measuring a communication quality by receiving the test traffic from the second measuring unit and analyzing the received test traffic; and c) at the first measuring unit, controlling the event frequency and the event amount according to the measured communication quality, and controlling the second measuring unit to generated test traffic according to the controlled event frequency and the controlled event amount.

BRIEF DESCRIPTION OF THE DRAWINGS

The above and other objects and features of the present invention will become apparent from the following description of the preferred embodiments given in conjunction with the accompanying drawings, in which:

FIG. 4 is a flowchart showing a system for measuring a communication quality in accordance with a preferred embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
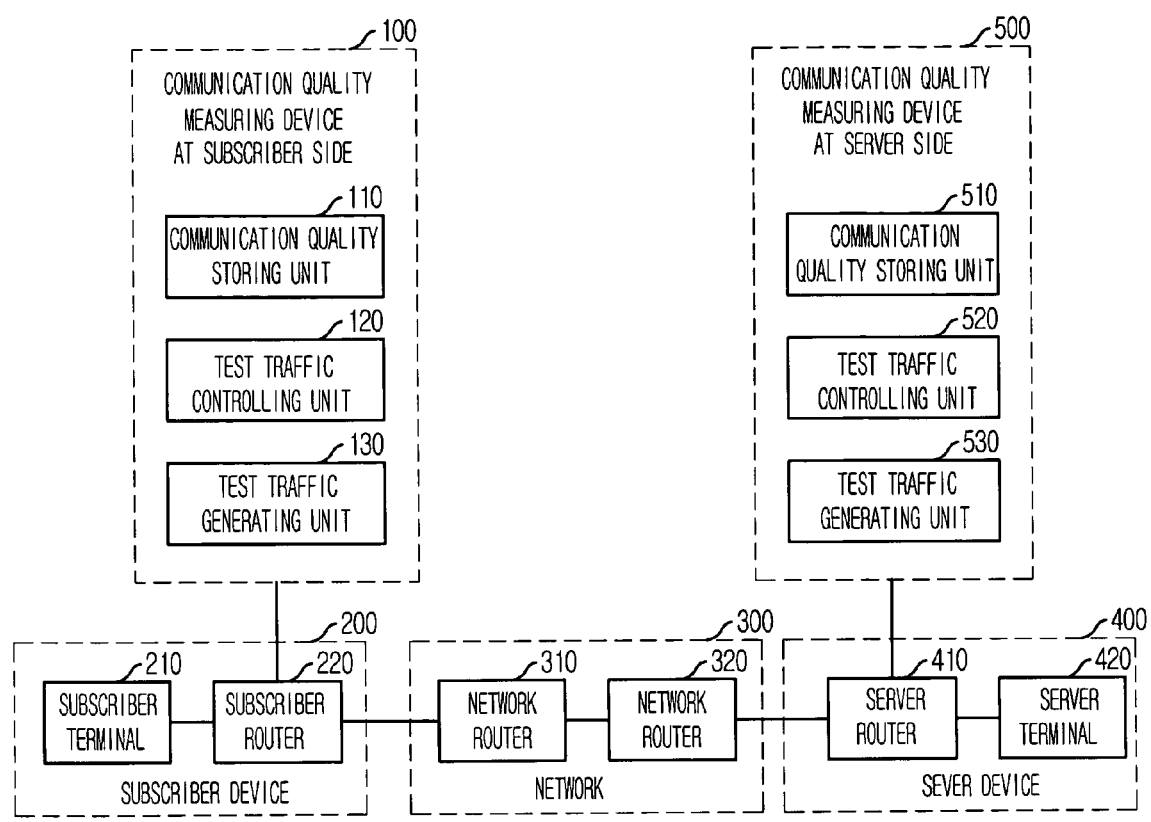
FIG. 1 is a block diagram illustrating a system for measuring a communication quality in accordance with a preferred embodiment of the present invention.

FIG. 1 is a block diagram illustrating a system for measuring a communication quality in accordance with a preferred embodiment of the present invention. That is, FIG. 1 shows a subscriber-side communication quality measuring device 100 and a server-side communication quality measuring device 500, which are connected through a subscriber device 200, a network 300 and a server device 400.

As shown in FIG. 1, the subscriber device 200 includes a subscriber terminal 210, and a subscriber router 220 for connecting the subscriber terminal 210 and the network 300.

The network 300 includes a first network router 310 for providing a communication service to the subscriber terminal 210 by matching the subscriber terminal 210 to the network 300, and a second network router 320 for providing a communication service to the server device 400 connected through a server router 420 by matching a server terminal 410 to the network 300. The network 300 includes a plurality of transmitting devices (not shown) configuring a communication network for transmitting data.

The server device 400 includes the server terminal 410 and the server router 420 for connecting the server terminal 410 to the network 300.

Meanwhile, the system for measuring a communication quality according to the present invention measures a communication quality based on the active scheme, and controls a generation frequency of a test traffic and an amount of a test traffic according to a current state of a communication network by analyzing the current state of a communication network based on a measured communication quality before generating the test traffic in order to minimize occupancy of a bandwidth by the test traffic.

In order to control the test traffic according to the current state of the communication network, the system for measuring a communication quality according to the present invention includes the subscriber-side communication quality measuring device 100 and the server-side communication quality measuring device 500, which are interacted by being connected through the subscriber device 200, the network 300 and the server device 400, as shown in FIG. 1. The subscriber-side communication quality measuring device 100 requests the server-side communication quality measuring device 500 to transmit a test traffic, and measures a communication quality based on a result of receiving the test traffic. After receiving the test traffic and measuring the communication quality based on the measured communication quality, the subscriber-side communication quality measuring device 100 controls a generation frequency and an amount of a next test traffic based on the currently measured communication quality and controls the server-side communication quality measuring device 500 to generates a test traffic according to the controlled generation frequency and the controlled amount. The server-side communication quality measuring device 500 generates the test traffic according to a generation frequency and an amount of the test traffic controlled and transmitted by the subscriber-side communication quality measuring device 100.

The subscriber-side communication quality measuring device 100 is connected to a subscriber router 220 of a subscriber device 200, and includes a communication quality storing unit 110, a test traffic controlling unit 120 and a test traffic generating unit 130.

The communication quality storing unit 110 stores communication quality measuring results of previous stages.

The test traffic controlling unit 120 measures a communication quality by receiving a test traffic from the server-side communication quality measuring device 500, stores the measured communication quality in the communication quality storing unit 110, and decides a generation frequency and an amount of a next test traffic for a next communication quality measuring stage based on the measured communication quality stored in the communication quality storing unit 110. Operations of the test traffic controlling unit 120 will be explained in detail with reference to FIG. 2 in later.

The test traffic generating unit 130 transfers the test traffic received from the server-side communication quality measuring device 500 to the test traffic controlling unit 120, and generates a traffic request signal including an amount of a test traffic decided according to a generation frequency decided in the test traffic controlling unit 120. The traffic request signal is outputted to the server-side communication quality measuring device 500.

Meanwhile, the server-side communication quality measuring device 500 is connected to a server router 420 of a server device 400, and includes a communication quality storing unit 510, a test traffic controlling unit 520 and a test traffic generating unit 530.

The communication quality storing unit 510 stores communication quality measuring results of previous test stages.

The test traffic controlling unit 520 controls the test traffic generating unit 530 to generate a test traffic according to the controlled amount in response to the subscriber-side communication quality measuring device 100. That is, the test traffic controlling unit 520 controls the test traffic generating unit 530 to generate the test traffic as much as the amount information included in the received traffic request signal, which is decided and transmitted from the subscriber-side communication quality measuring device 100.

The test traffic generating unit 530 transfers the traffic request signal received from the subscriber-side communication quality measuring unit 100 to the test traffic controlling unit 520, and generates the test traffic in response to the test traffic controlling unit 520.

Operations of the system for measuring a communication quality according to the present invention will be described with reference to FIGS. 2 and 3 hereinafter.

Figure 2:
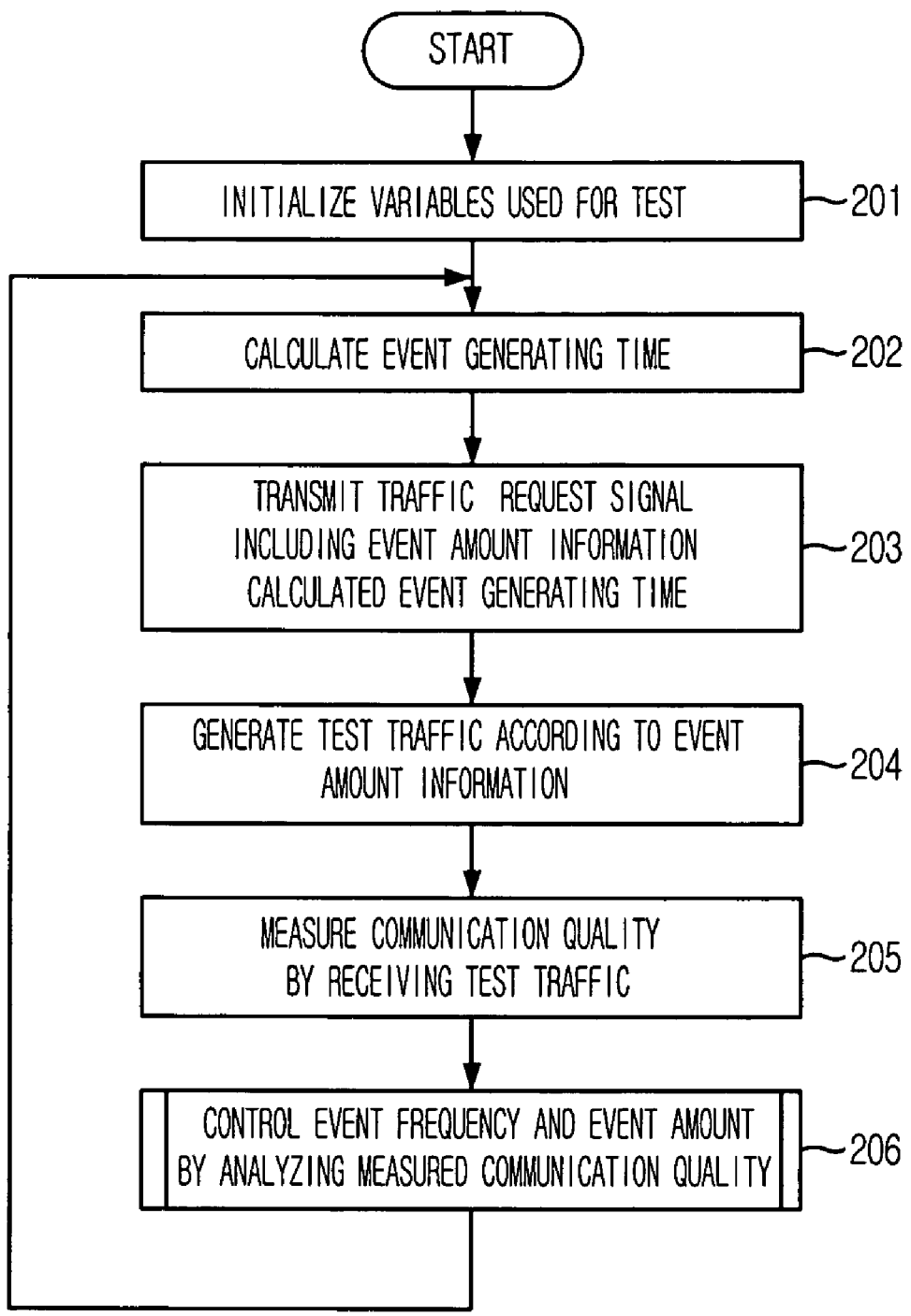
FIG. 2 is a flowchart showing a method for measuring a communication quality in accordance with a preferred embodiment of the present invention.

FIG. 2 is a flowchart showing a method for measuring a communication quality in accordance with a preferred embodiment of the present invention.

Referring to FIG. 2, when the system for measuring communication quality according to the present invention is turned on for measuring a communication quality, various variables used in communication quality measurement are initialized at step 201. Such variables are an event frequency, an event amount, an even generation time, a maximum event frequency, a minimum event frequency, a maximum event amount, a minimum event amount, a reference delay, a previous delay, and a current delay.

The event frequency is initialized as the maximum event frequency, the event size is initialized as the maximum event frequency and the previous delay is initialized as the reference delay. Also, the current delay is initialized as 0 second.

After initializing, an event generation time is calculated by using a value of the event frequency at step 202. A traffic request signal including information of an event amount is transmitted to the server-side communication quality measuring device 500 at the calculated event generation time at step 203. Inhere, a value of initial event amount is initialized as a maximum event amount as described above.

Meanwhile, the server-side communication quality measuring device 500 receives the traffic request signal from the subscriber side communication quality measuring device 100, generates a test traffic according to the event amount information included in the received traffic request signal, and transmits the generated test traffic to the subscriber-side communication quality measuring device 100 at step 204.

Then, the subscriber-side communication quality measuring device 100 receives the test traffic from the server-side communication quality measuring device 500, and measures a communication quality at step 205. After measuring, the subscriber-side communication quality measuring device 100 controls the event frequency and the event amount based on the result of the communication quality measurement at step 206.

Figure 3:
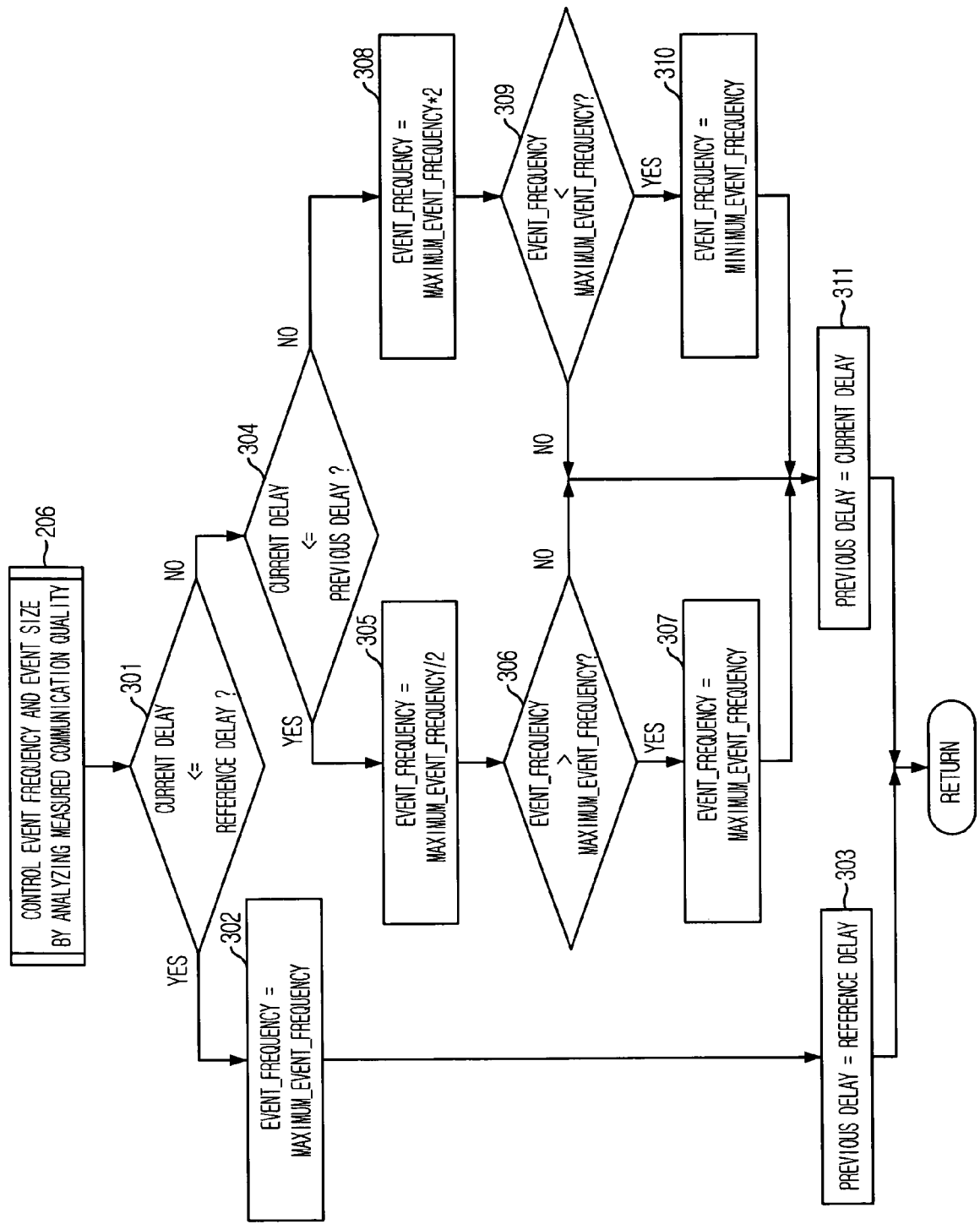
FIG. 3 is a flowchart showing controlling an event frequency in a method for measuring a communication quality in accordance with a preferred embodiment of the present invention.

That is, if the current delay is short than the reference delay at step 301 as shown in FIG. 3, the event frequency is controlled to be set as the maximum event frequency, and the event amount is also controlled to be set as the maximum event amount at step 302. The previous delay time is set as the reference delay time at step 303. After setting the reference delay time at step 303, the above described steps 202 to S206 are repeatedly performed.

Meanwhile, if the current delay is longer than the reference delay at step 301, it determines whether the current delay is shorter than the previous delay at step 304.

If the current delay is shorter than the previous delay at step 304, the event frequency is reduced to ½ and the event amount is increased two times at step 305. That is, generation frequency and amount of a test traffic increases by reducing the event frequency and increasing the event amount.

And, it determines whether the current event frequency exceeds the maximum event frequency at step 306. If the current event frequency exceeds the maximum event frequency at step 306, the event frequency is set as the maximum event frequency and the event amount is set as the maximum event amount at step 307. Also, the previous delay is set as the current delay at step 311. After setting the previous delay as the current delay, the above described steps 202 to 206 are repeatedly performed.

In other hand, if the current event frequency is less than the maximum event frequency at step 306, the previous delay is set as the reference delay at step 311, and the above described steps 202 to 206 are repeatedly performed.

Meanwhile, if the current delay is longer than the previous delay at step 304, the event frequency increase two times and the event amount is reduced to ½ at step 308. That is, a generation frequency and an amount of the test traffic are reduced by increasing the event frequency and reducing the event amount.

Inhere, it determines whether the event frequency is less than the minimum event frequency at step 309. The event frequency is larger than the minimum event frequency at step 309, the previous delay is set as the current delay at step 311, and the above described steps 202 to 206 are repeatedly performed. In other hand, if the event frequency is less than the minimum event frequency at step 306, the event frequency is set as the minimum event frequency and the event amount is set as the minimum event amount at step 310. After setting the minimum event amount, the above described steps 202 to S206 are repeatedly performed.

Hereinafter, entire operations of the system for measuring a communication quality will be explained again with reference to FIG. 4.

FIG. 4 is a flowchart showing a system for measuring a communication quality in accordance with a preferred embodiment of the present invention.

Referring to FIG. 4, the subscriber-side communication quality measuring device 100 decides an event frequency and an event amount when the subscriber-side communication quality measuring device 100 is turned on, generates an initial traffic including the decided event frequency and event amount, and transmits the initial traffic to the server-side communication quality measuring device 500 at step 401.

The server-side communication quality measuring device 500 receives the initial traffic from the subscriber-side communication quality measuring device 100, extracts the event amount from the initial traffic, generates test traffic according to the extracted event amount, and transmits the generated test traffic to the subscriber-side communication quality measuring device 100 at step 402.

The subscriber-side communication quality measuring device 100 receives the test traffic from the server-side communication quality measuring device 500, and measures a communication quality from the received test traffic. Then, the subscriber-side communication quality measuring device 100 controls the event frequency and the event amount by analyzing the measured communication quality, generates a controlled traffic including the controlled event amount according to the controlled event frequency, and transmits the controlled traffic to the server-side communication quality measuring device 500 at step 403.

Then, the server-side communication quality measuring device 500 receives the controlled traffic from the subscriber-side communication quality measuring device 100, extracts the controlled event amount from the controlled traffic, generates a test traffic according to the extracted event amount, and outputs the generated test traffic to the subscriber-side communication quality measuring device 100 at step 404.

The subscriber-side communication quality measuring device 100 receives the test traffic from the server-side communication quality measuring device 100, and measures a communication quality based on the received test traffic. Then, the subscriber-side communication quality measuring device 100 controls the event frequency and the event amount by analyzing the measured communication quality, generates a controlled traffic including the controlled event amount according to the controlled event frequency, and transmits the controlled traffic to the server-side communication quality measuring device 500 at step 405.

As described above, the communication quality is measured by dynamically changing the event frequency and the event amount based on previous communication quality measuring results in the present invention. Therefore, the system for measuring a communication quality according to the present invention minimizes influence of the test traffic to the communication quality and minimizes communication quality distortion by the test traffic.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean patent application No. 2004-0107263, filed in the Korean Intellectual Property Office on Dec. 16, 2004, the entire contents of which is incorporated herein by reference.

While the present invention has been described with respect to the particular embodiments, it will be apparent to those skilled in the art that various changes and modifications may be made without departing from the scope of the invention as defined in the following claims.

What is claimed is:

1. A system for measuring a communication quality, comprising:
   a first communication quality measuring unit for directly requesting a second communication quality measuring unit to transmit a test traffic, measuring a communication quality from the test traffic received from the second communication quality measuring unit as a response of the request, and controlling a generation frequency and an amount of test traffic for a next communication quality measuring stage by analyzing the measured communication quality; and
   the second communication quality measuring unit for generating a test traffic by controlling a generation frequency and an amount of the test traffic according to a request directly received from the first communication quality measuring unit, wherein each of the next communication quality measuring stages for generating a next test traffic by controlling a next generation frequency and a next amount of the next test traffic from the second communication quality measuring unit is analyzed based on the measured communication quality of the previous received test traffic directly received from the first communication quality measuring unit.

2. The system as recited in claim 1, wherein the first communication quality measuring unit includes:

a storing unit for storing previous results of measuring communication a quality;

a first controlling unit for measuring a communication quality from the test traffic received from the second communication quality measuring unit, storing the measured communication quality in the storing unit, and controlling a generation frequency and an amount of a test traffic for the next communication quality measuring stage based on the stored communication quality; and a first traffic generating unit for generating a traffic request signal including the controlled amount decided in the first controlling unit according to the controlled generation frequency In the first controlling unit, and outputting the generated traffic request signal to the second communication quality measuring unit.

3. The system as recited in claim 2, wherein when the first controlling unit determines that a current delay is shorter than a predetermined reference delay by analyzing a previous communication quality, the first controlling unit controls the generation frequency and the amount of the test traffic for the next communication quality measuring stage by setting an event frequency as a predetermined maximum event frequency, setting an event amount as a predetermined maximum event amount, and setting a previous delay as a reference delay.

4. The system as recited in claim 3, wherein when the first controlling unit determines that a current delay is longer than a predetermined reference delay by analyzing a previous communication quality, the first controlling unit determines whether the current delay is shorter than a previous delay;

if the current delay is shorter than the previous delay, the first controlling unit reduces an event frequency within a predetermined maximum event frequency and increases an event amount within a predetermined maximum event amount; and if the current delay is longer than the previous delay, the first controlling unit increases an event frequency within a predetermined minimum event frequency and reduces an event amount with a predetermined minimum event amount.

5. The system as recited in claim 1, wherein the first communication quality measuring unit connected to a subscriber-side router connected to a subscriber terminal.

6. The system as recited in claim 1, wherein the second communication quality measuring unit includes:

a second controlling unit for controlling to generate a test traffic corresponding to a test traffic amount included in the traffic request signal received from the first communication quality measuring unit; and a second traffic generating unit for generating a test traffic in response to the second controlling unit.

7. The system as recited in claim 6, wherein the second communication quality measuring unit is connected to a server-side muter connected to a server terminal.

8. A method for measuring a communication terminal, the method comprising:

a first measuring unit, initializing an event frequency and an event amount, and controlling a second measuring unit to generate a test traffic according to the initialized event frequency and the initialized event amount;

the first measuring unit, measuring a communication quality by receiving the test traffic directly from the second measuring unit and analyzing the received test traffic; and the first measuring unit, controlling the event frequency and the event amount according to the measured communication quality directly received from the second measuring unit, and directly controlling the second measuring unit to generated test traffic transmitted directly to the first measuring unit according to the controlled event frequency and the controlled event amount that was previously directly received from the second measuring unit.

9. The method as recited in claim 8, wherein the first measuring unit, initializing the event frequency and the event amount, and controlling the second measuring unit to generate the test traffic according to the initialized event frequency and the initialized event amount includes the steps of:

defining variables including the event frequency and the event amount and initializing the defined variables;

calculating a time of event generation by using the initialized event frequency value; and controlling the second measuring unit to generate a test traffic according to the initialized event amount at the calculated time of event generation.

10. The method as recited in claim 8, wherein in the first measuring unit, controlling the event frequency and the event amount according to the measured communication quality, and controlling the second measuring unit to generated test traffic according to the controlled event frequency and the controlled event amount, if the first measuring unit determines that a current delay is shorter than a predetermined reference delay by analyzing a previous communication quality, the first measuring unit sets an event frequency as a predetermined maximum event frequency, sets an event amount as a predetermined maximum event amount, and sets a previous delay as a reference delay.

11. The method as recited in claim 8, wherein in the first measuring unit, controlling the event frequency and the event amount according to the measured communication quality, and controlling the second measuring unit to generated test traffic according to the controlled event frequency and the controlled event amount, if the first measuring unit determines that a current delay is longer than a predetermined reference delay by analyzing a previous communication quality, the first measuring unit determines whether the current delay is shorter than a previous delay;

if the current delay is shorter than the previous delay, the first measuring unit reduces an event frequency within a predetermined maximum event frequency and increases an event amount within a predetermined maximum event amount; and if the current delay is longer than the previous delay, the first controlling unit increases an event frequency within a predetermined minimum event frequency and reduces an event amount with a predetermined minimum event amount.

* * * * *